United States Patent [19]

Tuss et al.

[11] Patent Number: 4,682,418

[45] Date of Patent: Jul. 28, 1987

[54] COORDINATE MEASURING MACHINE

[75] Inventors: John J. Tuss, Englewood; Robert D. Donaldson, Centerville, both of Ohio

[73] Assignee: The Warner & Swasey Company, Cleveland, Ohio

[21] Appl. No.: 882,572

[22] Filed: Jul. 7, 1986

[51] Int. Cl.[4] .............................................. G01B 7/03
[52] U.S. Cl. ...................................... 33/1 M; 33/503
[58] Field of Search ................ 33/1 M, 503, 504, 505, 33/556, 572

[56] References Cited

U.S. PATENT DOCUMENTS 4,175,327  11/1979  Herzog ............................. 33/503 X
4,551,919  11/1985  Sakata et al. ..................... 33/503 X Primary Examiner—Harry N. Haroian
Attorney, Agent, or Firm—John R. Benefiel; Raymond J. Eifler

[57] ABSTRACT

A coordinate measuring machine (10) having a light weight aluminum bridge (24) mounted for guided movement along ways (42) on a base (28), which also is constructed of aluminum to match thermal growth characteristics of the bridge (24). The table (12) is constructed of steel for greater rigidity to support heavy measured objects (1b) and is supported on the base (28) so as to minimize distortions of the base (28) by differences in thermal growth of the table (12), and base (28). The weight of the table (12) and measured object (16) is arranged to be passed through the base (12) to floor supports (62, 112) to minimize distortions of the base (12) and ways (42). The bridge (24) is movable completely to the rear of the table (12) to enable access of the probe (18) to the total table surface area FIG. 2.

10 Claims, 8 Drawing Figures

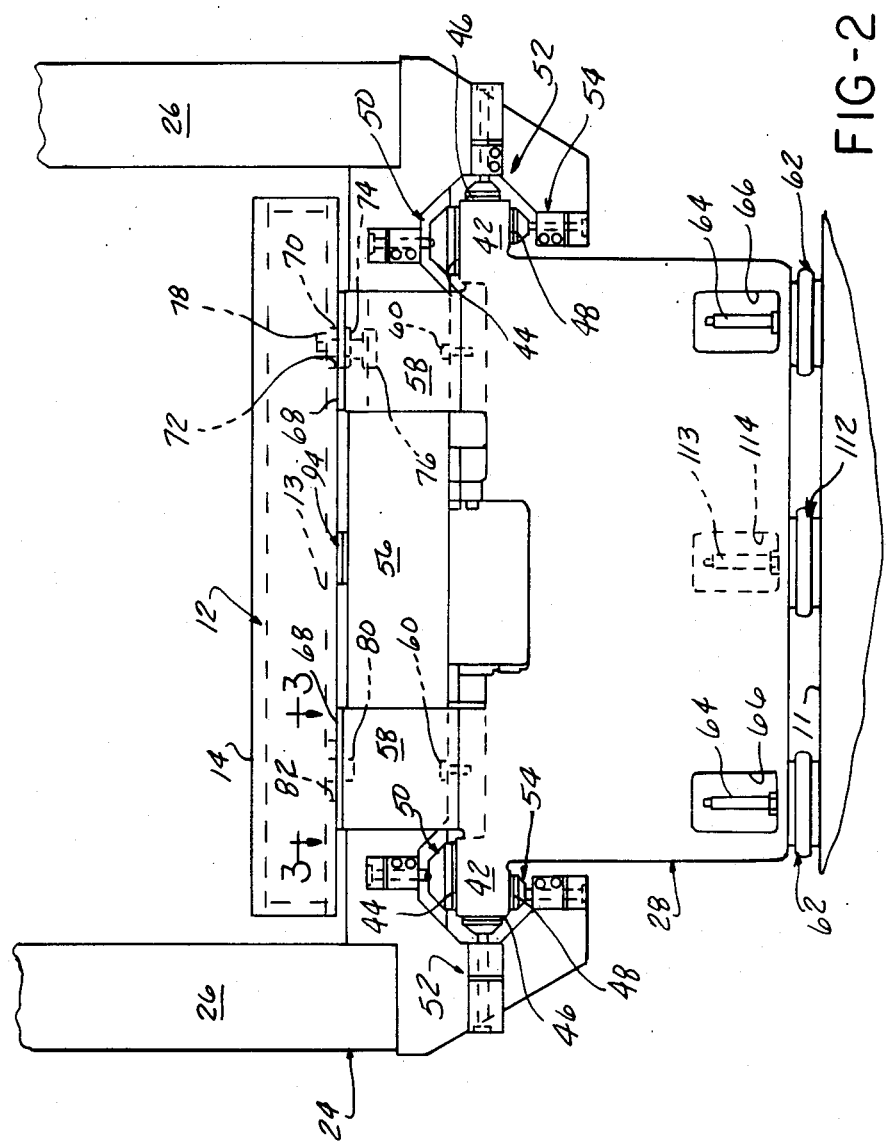

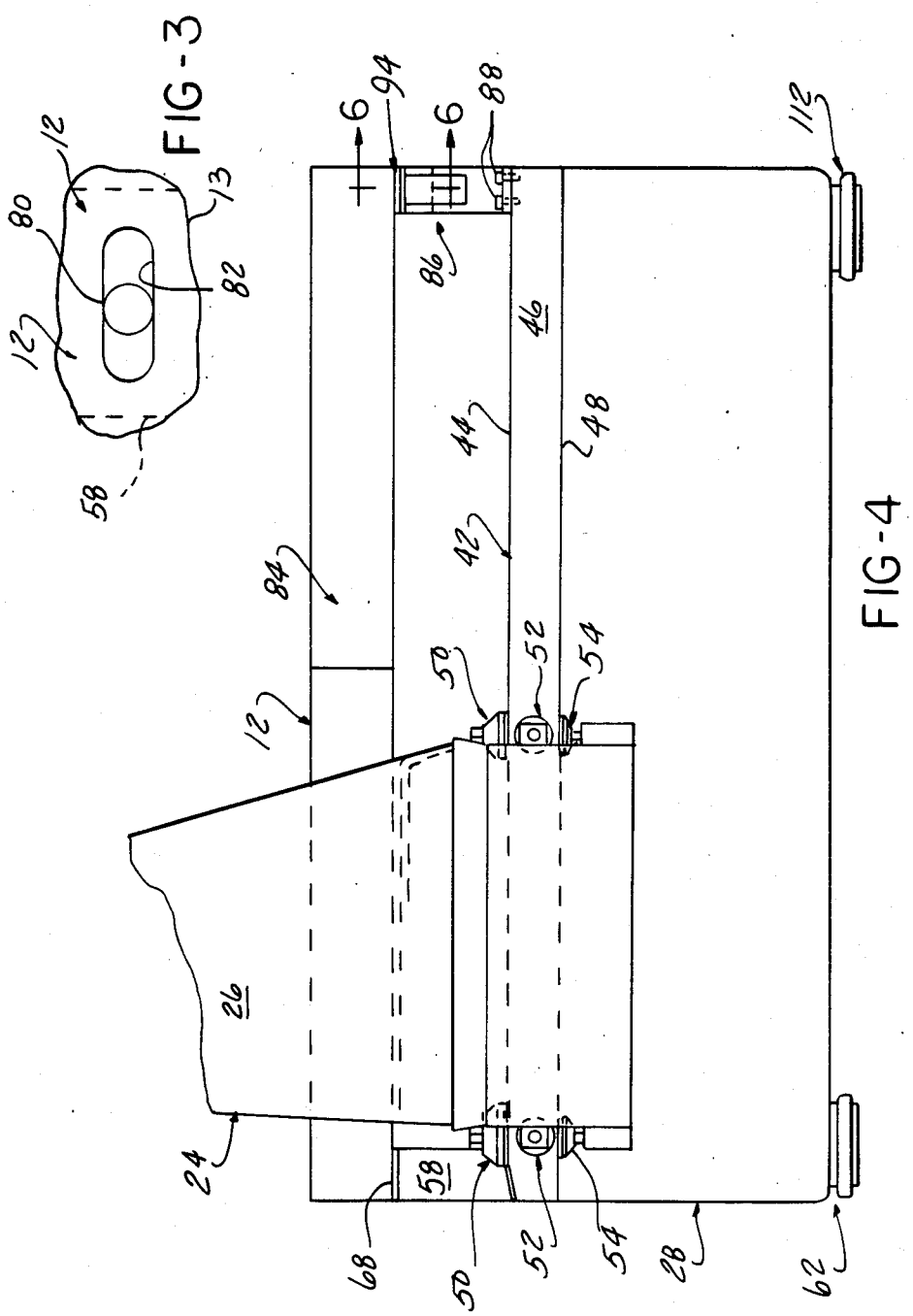

COORDINATE MEASURING MACHINE

This invention relates to the field of dimensional measurement, and more particularly concerns coordinate measuring machines.

BACKGROUND

Coordinate measuring machines are known of the type including a bridge supported on a base for guided movement along a first horizontal axis, a carriage mounted on the bridge for guided movement along a second horizontal axis, and a probe mounted for guided vertical movement on the carriage. Thus, guided movement of the probe tip is provided along three orthogonal axes with respect to the horizontal surface of a table on which an object to be measured is supported.

In such machines, transducer means are provided to generate electrical signals precisely corresponding to the probe movement along each axis. Movement of the probe between points on the object thus allows precision measurement between these points on the object by appropriate processing and display of the transducer signals.

In these machines, the bridge is mounted to be movable along "Y" axis ways formed on the base, the bridge having a pair of upstanding members extending above the table surface, with a connecting cross member extending thereacross, and supporting the carriage for movement along "X" axis ways formed on the cross-member. The probe is mounted for vertical movement on the carriage along a "Z"-axis.

In U.S. Pat. No. 4,594,791, issued June 17, 1986, for "A Bridge Type Coordinate Measuring Machine", there is described a "ring bridge" construction in which the bridge completely encircles the table to form a "closed loop" and thereby improve the rigidity of the bridge.

Rigidity is critical so as to insure precise repeatable correspondence between the movement of the probe and the measured movement of the bridge and carriage along each of the X and Y axes.

In order to improve the speed with which the bridge may be driven, a lightweight construction of aluminum is employed. In order that differences in thermal growth characteristics do not create slight variations of the bridge movement on the ways when temperature fluctuations occur, the base must also be constructed of aluminum.

On the other hand, the table, which directly supports the object to be measured, should be quite rigid in order to not be deflected excessively from the weight of heavy objects to be measured, such as engine blocks and the like. Steel is thus a desirable material from which to construct the table so as to provide a rigid surface with reasonable table dimensions. The use of a diverse material in the table makes desirable an arrangement for mounting the table to the base to minimize distortions of the base which could effect the movement of the bridge thereon by temperature changes occurring during the making of measurements.

The weight of the table and object should itself not cause excessive distortion of the base and the ways, particularly with heavier measured objects.

Additionally, access by the probe to all points on the table is desirable in order that the entire surface of the table provides a useful operating area of the machine. If the bridge movement is not adequate to enable such probe access, the table surface available for making measurements is reduced, to lessen the capacity of the machine.

SUMMARY OF THE INVENTION

The present invention comprises a coordinate measuring machine having a table and base arrangement in which a three point support of the table is provided substantially aligned with a three point floor support of the base, in turn spaced inwardly from bridge guide ways formed on the base extending along the Y-axis.

The generally rectangular table has an elongated table extension member affixed to one side and extending away in the direction of the Y-axis with the lower cross member of a ring bridge passing underneath. Two of the support points for the table are located spaced apart beneath the other side of the table, while the third point is located beneath the free end of the table extension. A first one of the two support points located beneath the other side of the table is pinned to the table and base allowing only low friction rotation while the other comprises a pin and slot connection allowing growth only in a direction normal to the Y-axis, parallel to the table side.

The third support point holds the table with a bearing allowing frictionless growth-induced movement of the end of the table extension in any horizontal direction. These connections minimize thermal stresses when the table and base are constructed of diverse materials, i.e., from steel and aluminum respectively, so that these stresses do not impose random distortions on the ways or the loss of precise orientation of the table with the direction of movement of the bridge along the Y-axis.

The various components preferably have light colored covers and coatings applied thereto which minimize absorption of infrared radiation to thereby reduce temperature fluctuations caused by absorption of infrared radiation.

The ways extend beyond the table and along the table extension so that sufficient bridge travel is enabled to provide complete access of the probe over the entire table surface, even with the probe mounted on the side of the bridge remote from the table extension, to thereby maximize the use of the table surface area for making measurements.

The advantage of the table and base arrangement of the present invention is that it allows the use of an aluminum bridge and aluminum base, combined with a steel table, without creating significant inaccuracies when ambient temperature changes occur, due to distortions caused by unequal thermal growth in the table, base or bridge.

Another advantage of the invention is the enablement of complete probe access to the entire table surface, even with the probe mounted on the table side of the bridge upper cross member.

A further advantage of the mounting arrangement of the table on the base is that it minimizes distortion of the base ways by the combined table and object weight.

DETAILED DESCRIPTION OF THE INVENTION

FIG. 1 is a perspective view of a coordinate measuring machine utilizing a table and base structure according to the present invention, shown with enclosing covers in place.

3

FIG. 2 is a front elevational view of the table and base incorporated in the coordinate measuring machine shown in FIG. 1.

FIG. 3 is a fragmentary view of a portion of the machine shown in FIG. 2, in the direction of the arrows 3—3 in FIG. 2.

FIG. 4 is a side elevational view of the table and base shown in FIG. 2.

Figure 1:
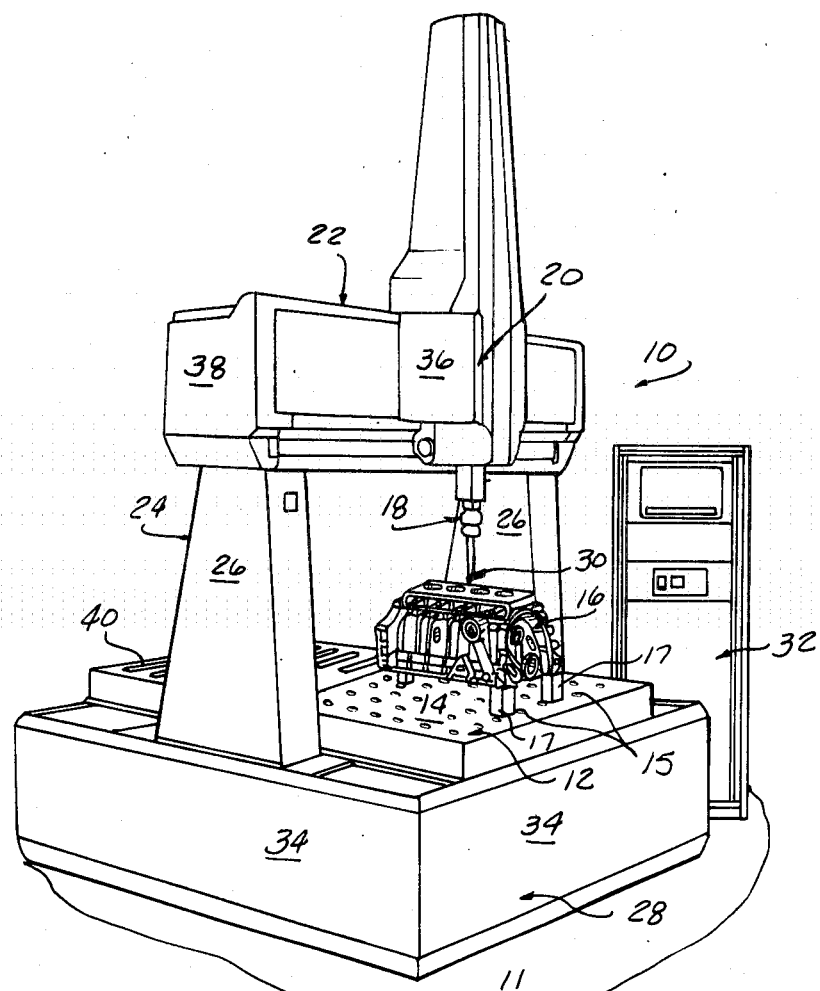

FIG. 1 illustrates a coordinate measuring machine 10 of the type with which the present invention is concerned, including a table 12 having a rectangular upper surface 14 adapted to receive an object to be measured such as an engine block 16, with tapped holes 15 is allowing securement of mounts 17 thereto.

A probe 18 is mounted for guided movement above the table surface 14 along the three orthogonal axes defining a measuring space above the surface 14.

This movement is enabled by mounting the probe 18 for vertical or Z-axis movement on a carriage 20, which in turn is mounted for movement in a horizontal plane along an X-axis on an upper cross member 22 of a ring bridge 24.

The upper cross member 22 is integral with generally vertical upstanding side members 26 extending down below the table 12, with a lower cross member (not shown in FIG. 1) connected between the lower ends thereof.

The bridge 24 is in turn mounted for guided movement on a base 28 resting on the floor or foundation 11 along a second horizontal direction, orthogonal to the direction of movement of the carriage 20 to define a Y-axis motion.

Thus by the combined movement of the probe 18, carriage 20, and bridge 24, the probe tip 30 may be moved to any point within a measuring space above the table surface 14.

A suitable well known transducer means is utilized for generating electrical signals corresponding to the probe movement along the vertical axis (Z), and of the carriage 20 and bridge 24 along the horizontal X and Y axes, such as the Moire fringe grating arrangements described in U.S. Pat. No. 2,886,717 issued on May 12, 1959 for "Measuring Apparatus" and U.S. Pat. No. 2,886,718 also issued on May 12, 1959 for "Measuring Apparatus".

The signals so generated are processed and displayed as in a processing electronics display (32).

Since suitable signal generating, processing and display components are generally well known to those skilled in the art, a detailed description is not here included.

According to one aspect of the present invention, the base 28 is enclosed with covers 34, the carriage 20 is also enclosed with a cover 36, and cover 38 encloses the upper cross member 22 of carriage 20. A cover fits over the top region of the base 28 behind the table 12.

A light colored coating such as an industrial grade of paint is applied to the exposed surfaces of upstanding bridge side members 26. Thus, the exterior of the coordinate measuring machine 10 has applied thereto either light colored covers or a similar coating to minimize the absorption of infrared radiation, to in turn minimize temperature fluctuations of the underlying structural parts caused by absorption from random sources of such radiation. This reduces the thermally induced distortions which can occur tending to produce non repeatable errors in the readings obtained by movement of the bridge 24 on the base 28.

The details of mounting of the covers are disclosed in copending patent application Ser. No. 882,573, filed July 7, 1986.

FIG. 2 shows the details of the mounting of the bridge 24 and table 12 on the base 28, shown with the covers 32 removed.

The base 28 is formed of an aluminum casting, with a pair of integral ways spaced apart and parallel to the Y-axis, having way surfaces 44, 46, and 48 coated with a suitable hard coating to be scratch resistant, such as a flame sprayed nickel chrome alloy powder, ground to a smooth (15 rms), true surface. This surface treatment of the way surfaces 44, 46, 48, is important to prevent slight variations in the bridge movement caused by disturbance of the action of air bearings supporting and guiding the bridge (24) thereon.

Corresponding pairs of fore and aft spaced air bearing assemblies 50, 52 and 54 are mounted on the bridge 24 to provide bridge guide means acting on corresponding way surfaces 44, 46 and 48, enabling controlled guided movement of the bridge 24 on the base 28 which is substantially frictionless by virtue of being floated on a thin film of air. The air bearings are also preloaded to establish very accurately controlled repeatable bridge movement along the Y-axis.

Since such air bearing assemblies and suitable air supply means are available commercially, the details are not here set out.

The bridge 24 is also constructed of aluminum and may be formed of a casting comprising a lower cross member 56 welded to side members 26 and upper cross member 22, which may be fabricated of formed aluminum panels welded together.

The bridge lower cross member 56 passes beneath the table 12, such that the bridge 24 is of a "closed loop" or ring construction to provide maximum rigidity, as described in the above cited U.S. patents.

The table 14 is a steel weldment, and is mounted on the base by table support means 58 including a pair of spaced apart aluminum table front support blocks 58a and 58b and attached as by cap screws 60 to the upper surface of base 28 located along the forward side of the table 14.

The front side of the base 28 is in turn supported by resilient vibration isolating pads 62 located substantially vertically aligned beneath each of the points of support of the table 12 on the base constituted by table front support blocks 58a and 58b. Thus, the weight of the table 12 (and any object disposed thereon) passes through to the floor rather than tending to deflect the ways 42 located outboard therefrom. Suitable leveling screws 64 are provided, accessible through openings 66 in the base 28.

The underside of the front side of the table 12 rest on low friction bearing plates 68, which may be constituted by a thin layer of way material, interposed above each support 58. The right hand front support block 58a as viewed in FIG. 2, provides complete fixation in the horizontal plane, but allows free rotation to establish a pinned joint relationship.

This is created by a bushing 70 received in corresponding aligned bores 72 and 74 machined into the bottom panel 13 of table 14 and the upper side of the support block 58a respectively. A suitable keeper bolt 76 and nut 78 may be installed for shipping and removed at installation to minimize any pivotal friction in the joint.

FIG. 3 illustrates that the left hand front support block 58b has a pin and slot connection to the table 12, provided by a pin 80 carried in the support block 58b and received in a slot 82 formed in bottom panel 13 of table 12.

The X-axis alignment of slot 82 insures constrained thermal growth along that direction.

Figure 5:
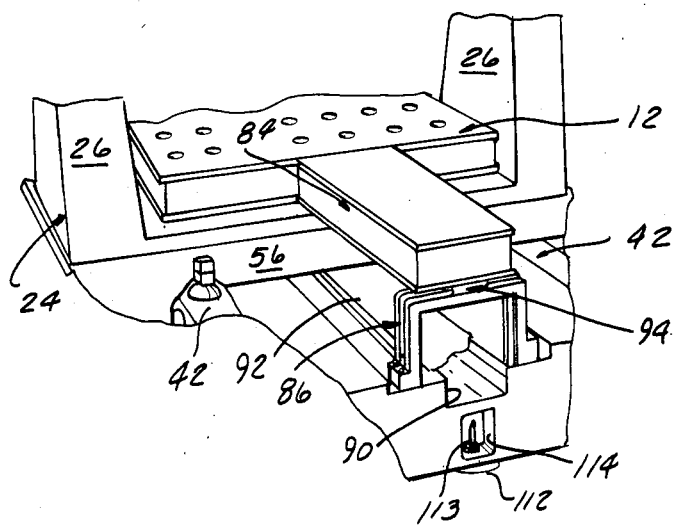
FIG. 5 is a rear perspective view of the table and base shown in FIGS. 2 and 4.

FIGS. 4 and 5 show that a three point support for the table 12 on the base 24 is completed by a third point of support located beneath the rear end of an elongated table extension member 84. Table extension member 84 may comprise a steel weldment affixed to the table 12 on the side opposite the front support blocks 58a and 58b, and extends away from the table 12 in a direction parallel to the Y-axis movement of the bridge 24.

The free end of the table extension member 84 rests on a rear stand assembly 86, affixed by cap screws 88 to the upper surface of the base 28. The rear stand assembly 86 is generally of an inverted U-shape so as to straddle a central channel 90 formed in the base 28 to accommodate a drive belt 92 driving the bridge 24 to move along the ways 42 for powered measuring motion by a driver motor (not shown).

Figure 6:
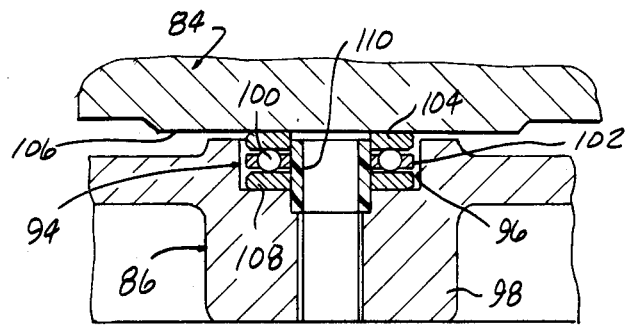
FIG. 6 is an enlarged view of the section taken along the lines 6—6 in FIG. 4.

FIG. 6 illustrates a bearing means 94 provided interposed between the rear stand assembly 86 and the underside of table extension member 84 receiving in part the weight of the table while allowing limited free movement in any direction in the plane of the table 12. This support accommodates thermal growth of the table 12 and extension member 84 in any direction to avoid imposing stresses on the base 28 while maintaining squareness of the table 12 to the ways 42.

The thrust bearing means 94 comprises a ball bearing assembly 94 received within a bore 96 formed in boss 98 integral with rear stand 86. Ball bearing assembly 94 comprises a series of balls 100 diposed in openings in a retainer ring 102, with an upper thrust plate 104 engaged by the undersurface of a thickened area 106 of the underside of table extension member 84 and the upper surface of balls 100. A lower thrust plate 108 rests on the end wall of bore 96 and on which rests the balls 100.

Thus friction free limited relative movement between the table extension member 84 and the base 28 is allowed along any direction in the plane of the table surface 14. This is important since the relatively long distance between the front and rear table supports can result in significant movement due to thermal expansion, and even low friction at that point would impose undesirable distorting stresses on the machine structure.

In order to retain the ball bearing assembly 94 during initial assembly, a resilient centering plug 110 may be installed within central openings formed in each of thrust plate 104 and 108 and retainer ring 102.

The third point of the three point support of the base 28 is provided by rear pad 112 centered beneath the ball bearing assembly 94 and rear end of the table extension member 84. A height adjusting rod 113 is provided for leveling of the machine 10, accessible through opening 114 in the base 28.

Thus, the weight of the table 12 and table extension member 84 is transmitted to the floor through the base 28 and pads 62 and 112, such that distortion of the base 28 by the weight of the table 12 and measured object is minimized.

Figure 8:
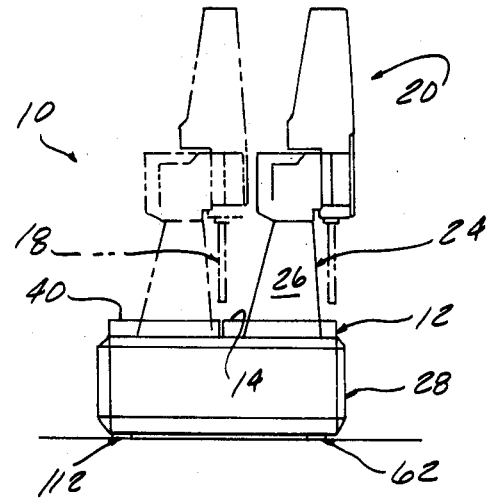
FIG. 8 is a simplified side elevational view of the coordinate measuring machine shown in FIG. 1, showing the extent of bridge travel with respect to the table.
Figure 7:
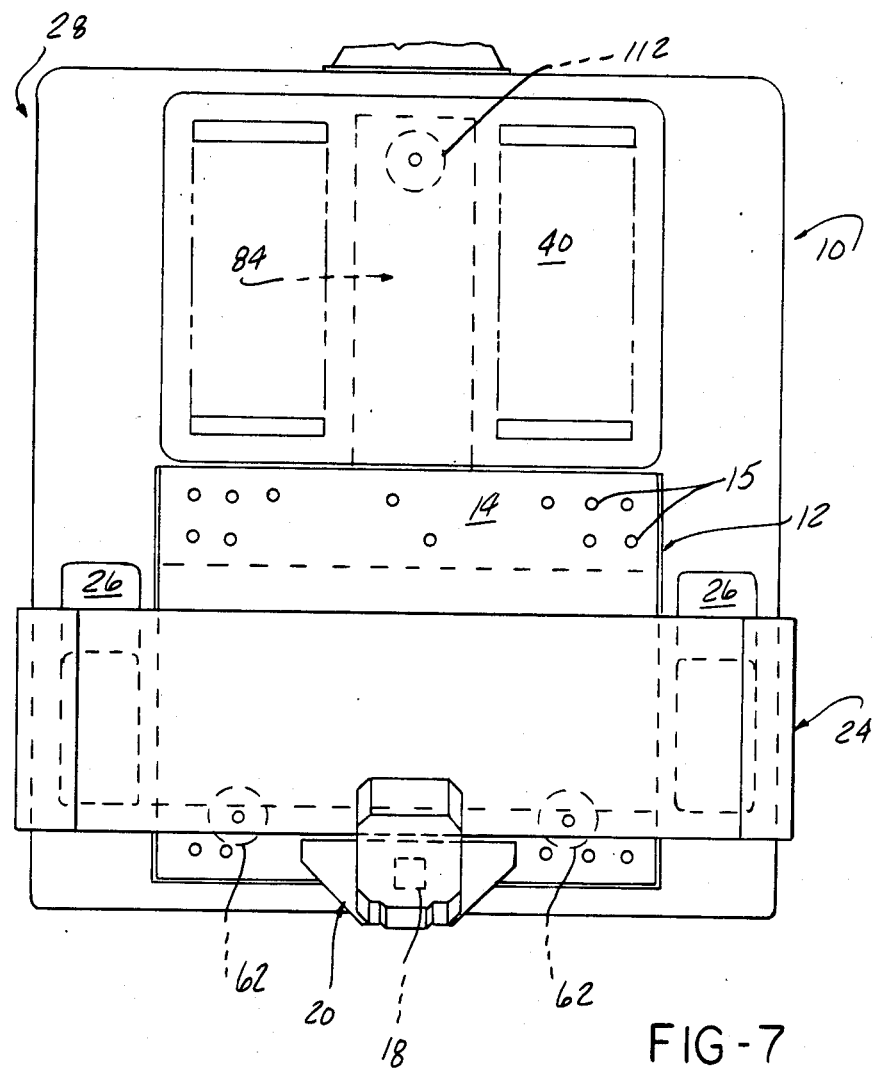
FIG. 7 is a plan view of the coordinate measuring machine shown in FIG. 1.

FIGS. 7 and 8 illustrate that while the probe 18 is mounted on the bridge 24 on the side towards the front of the machine 10, the length of the ways 42 and the presence of the table extension member 84 allow movement of the bridge 24 to the rear to an extent so as to provide complete access by the probe 18 to the entirety of table surface 14. This also allows complete access to the table surface 14 for loading and unloading of parts onto the table 12 with the bridge 24 moved fully to the rear of the machine 10.

We claim:

1. A coordinate measuring machine (10) with an improved table-base structure, said machine (10) of the type including a base (28); a generally rectangular table (12) having a planar upper surface (14) means (58a, 58b,) supporting said table on said base, a bridge (24) having upstanding side members (26) extending above and alongside said table; an upper cross member (22) connecting the upper ends of said upstanding side members (26) and a lower cross member (56) connecting the lower ends of said upstanding members (26) and passing beneath said table (12); guide means (42) mounting said bridge for guided movement along a first horizontal axis; a carriage (20) supported on said bridge (24) for movement along a second horizontal axis orthogonal to said first axis; and a probe (18) supported for vertical movement on said carriage (20); the improvement comprising:

an elongated table extension member (84) affixed to one side of said table (12) and extending away in a direction parallel to said first axis, with an extension member support (86) fixed to said base and located beneath the outer end of said table extension member (84), said extension member support comprising additional means supporting said table (12) on said base (28).

2. The coordinate measuring machine (10) according to claim 1 wherein said means supporting said table on said base (28) is comprised in part by a first and a second support (58a, 58b) each fixed to said base at locations spaced along the other side of said table (12) remote from said one side of said table, and together with said extension member additional support means (86) providing a three point support of said table (12) on said base (28).

3. The coordinate measuring machine (10) according to claim 2, wherein said first support is connected to said table (12) by means (70, 72, 74) pinning said table (12) and support (58a) together, preventing any relative lateral movement there between in a plane parallel to said table planar surface, while allowing free rotation therebetween; and said second support means includes means (80, 82) allowing relative movement between said table (12) and said second support (58b) only in a direction parallel to a line connecting said spaced supports; and, wherein the table (12) rests in part on said table extension support means (94) allowing free movement in any horizontal direction.

4. The coordinate measuring machine (10) according to claim 2 further including three base supports (62, 112) aligned beneath said first, second, and table extension supports for said table (12) on said base (28).

5. The coordinate measuring machine (10) according to claim 4 wherein said bridge guide means includes parallel way surfaces (44, 46, 48) formed on said base (28) at locations spaced outwardly from said base supports (62, 112).

6. The coordinate measuring machine (10) according to claim 1 wherein said bridge guide means (42) extends to allow movement of said bridge (24) past said table (12) and along said table extension member (84).

7. The coordinate measuring machine (10) according to claim 3 wherein said table (12) is constructed of steel and said base (28) and said bridge (24) are constructed of aluminum.

8. The coordinate measuring machine (10) according to claim 5 wherein said probe (18) is mounted on said carriage (20) on the side of said bridge upper cross member (22) remote from said table extension member (84) and wherein said bridge guide means (42) enables sufficient movement of said bridge (24) beyond said table (12) to enable complete access of said probe (18) to said table planar surface (14)

9. The coordinate measuring machine (10) according to claim 7 further including light colored covers (35, 38, 34, 40) and coatings applied substantially over the entire exterior of said machine (10).

10. The coordinate measuring machine according to claim 7 wherein said bridge guide means comprises spaced parallel way surfaces (44, 46, 48) integrally formed on said base (28) with a hard coating applied thereto, and also includes air bearing means (50, 52, 54) supporting and guiding said bridge (24) for movement along said way surfaces (44, 46, 48).

* * * * *